Jan. 5, 1932. A. E. JACOBS 1,839,316
SPINDLE DRIVE FOR MACHINE TOOLS
Filed Sept. 12, 1930
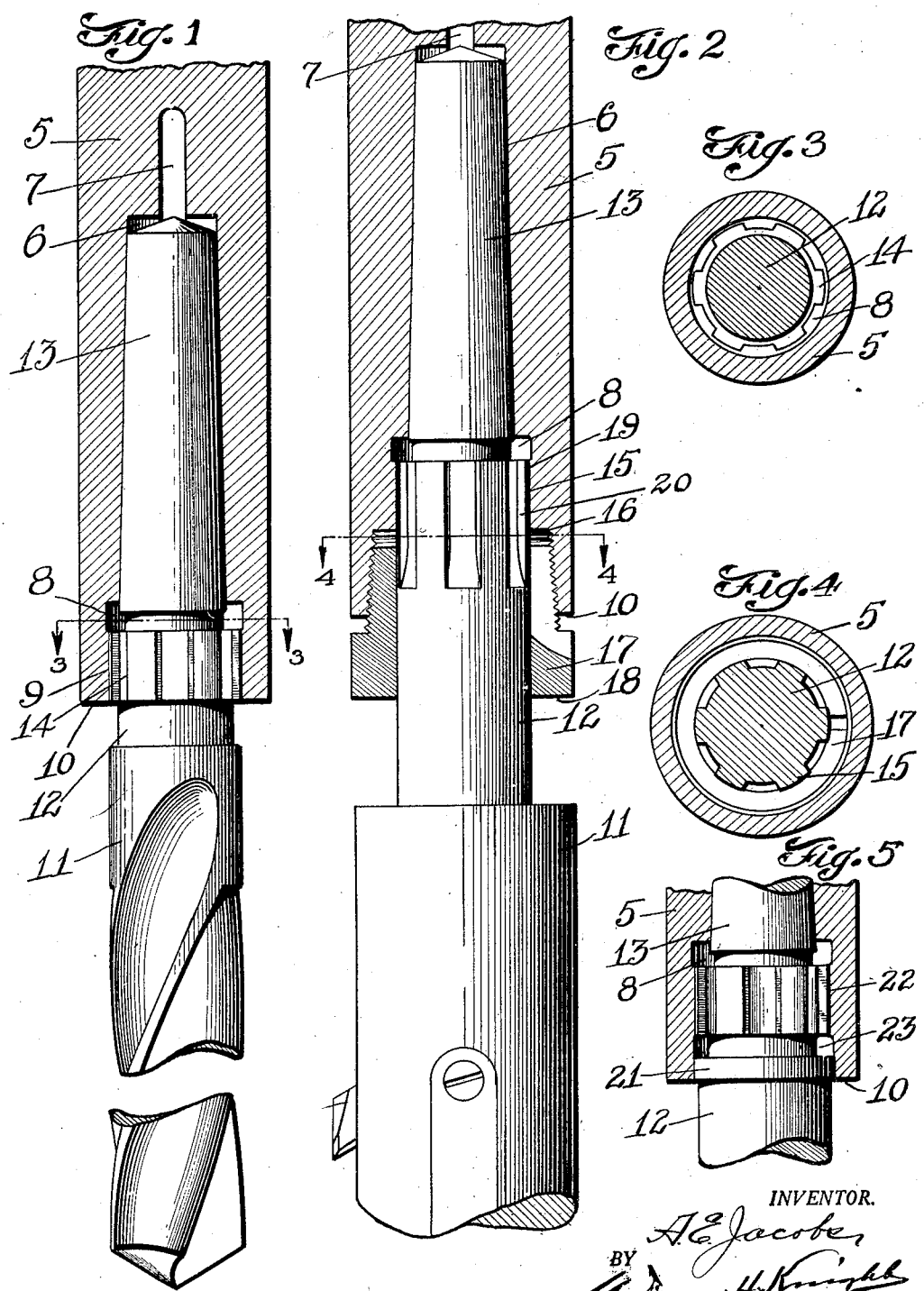
INVENTOR.
A. E. Jacobs,
BY
ATTORNEY Patented Jan. 5, 1932

1,839,316

UNITED STATES PATENT OFFICE

ARTHUR E. JACOBS, OF ROCKFORD, ILLINOIS, ASSIGNOR TO THE INGERSOLL MILLING MACHINE COMPANY, OF ROCKFORD, ILLINOIS, A CORPORATION OF ILLINOIS

SPINDLE DRIVE FOR MACHINE TOOLS

Application filed September 12, 1930. Serial No. 481,512.

The present invention relates to an improved spindle drive for machine tools and has for its primary object to provide a more positive and practical drive for the spindles of such machine tools as drills, boring bars, reamers, taps and other like tools which are detachably connected in driving relation with a driving element.

As heretofore practiced it has been customary to rely upon a tang on the end of the tapered shank of the tool to provide a driving fit between the driving and driven elements for the tool such as the spindle and the sleeve in which the spindle is received. In the present instance, this tang fitting is discarded in favor of a multiple-spline fitting and the multiple-spline fitting is used in a manner to provide a more positive and reliable drive for the tool without sacrificing production requirements.

In the accompany drawings:

Fig. 1 is a view partly in section, showing the preferred form of the invention;

Fig. 2 is a similar view showing a modified form of the invention;

Fig. 3 is a view in cross-section, on the line 3—3, Fig. 1;

Fig. 4 is a view in cross-section, on the line 4—4, Fig. 2; and

Fig. 5 is a detail view in section, of still another form of the invention.

Referring now to the drawings in detail, attention will first be invited to Fig. 1 wherein 5 represents the driving element, shown as preferably comprising a sleeve-like device. This sleeve 5 is made with a tapered internal bore 6 terminating in a slot 7 which extends through the sleeve. The opposite end of the tapered bore 6 opens into an enlargement 8 which in turn terminates in a reduction 9 extending to the end 10 of the sleeve.

11 represents a tool which in the present illustration is shown as either a drill, or other boring device. The tool is made with a driving element such as the spindle 12 having a tapered shank 13 adapted to occupy the tapered bore 6 of the sleeve. The tapered shank 13 functions as a locating pilot and snugly fits within the bore for this purpose. The spindle is made with a multiple-spline enlargement 14 in advance of the taper 13 and this splined portion is made to interlock with a companion spline in the reduction 9 of the sleeve. By means of the multiple-spline fitting thus provided and with the co-operation of the locating pilot provided by the taper 13, the tool 11, be it a drill or other rotary tool, may be connected in positive driving relation with sleeve 5. The slot 7 in the sleeve is provided to accommodate a tapered key for detaching the tool from the sleeve when occasion demands.

It is, of course, understood that the usual machining precautions will be used in fabricating the tool. The enlargement 8 at the end of the tapered bore 6 is provided to accommodate the shaping tool with which the spline on the inside of the sleeve is made.

Fig. 2 illustrates a detail modification of the same principle. In this form instead of arranging the spline at the end 10 of the sleeve 5 it is inset from the end as at 15. The sleeve is further recessed out as at 16 and provided with internal threads for the reception of a split nut 17. The use of this split nut 17 provides an elongated support or bearing 11 commencing at the enlargement 8 and terminating at the end 18 of the head of the nut 17. The straight portion 19 of the internal bore in the sleeve is splined to interlock with the spline 20 on the tool spindle, otherwise, the parts are arranged the same as in Fig. 1, that is to say, the tapered shank 13 is employed as well as the slot 7 and the tapered bore 6.

Referring now to Fig. 5, attention is called to still another modification of the principle wherein the multiple-spline fitting between the spindle 12 and the sleeve 5 is arranged intermediate the tapered shank 13 and an enlargement 21 on the spindle. The sleeve is made with the same enlarged but the spline in the sleeve is provided for a slight restriction in the bore of the sleeve as at 22. A second enlargement 23 is arranged in advance of the splined portion 22 and continues to the end 10 of the sleeve. The ring-like enlargement 21 on the spindle 12 has a diameter equal to the root of the spline in the sleeve and provides a bearing or support in advance of the spline so that with the support provided by the taper 13 the shank of the tool is supported on opposite sides of the spline.

I have shown three embodiments of the device all of which involve the same principle of a multiple-spline fitting serving as a drive between the driving and driven elements of the tool, however, there are other forms that may be used to put the invention to practical use and there are tools other than the types shown and described in connection with which the invention may be used. I therefore do not wish to be limited to the constructions selected for illustrating the invention.

Having thus described and shown an embodiment of this invention, what I claim and desire to secure by Letters Patent of the United States is:

1. A machine tool drive comprising a driving element having a tapered internal bore closed at its inner end and terminating in an enlarged threaded recess at its outer end, a tapered driven element adapted to occupy the bore in said driving element, a multiple-spline fitting within said bore between said driving and driven elements and extending in the direction of the axis of the driving and driven elements and a nut on the driven element threaded into said enlarged recess at the outer end of the bore providing a support for the driven element in advance of said spline fitting.

2. A machine tool drive comprising a driving element having a tapered bore, a tool spindle having a tapered shank adapted to occupy said bore, a multiple-spline fitting serving as a drive for connecting said elements in driving relation and a support for the tool spindle in advance of said multiple-spline fitting within the driving element, comprising an enlargement on said spindle providing a close sliding fit between the spindle and the driving element adjacent the end of said driving element.

3. A drive for machine tools, comprising a driving element having an internal bore terminating in a non-tapered enlargement, a tool spindle adapted to occupy said bore and a multiple splined fitting between the tool spindle and the driving element within said non-tapered enlargement of the bore of the driving element.

Signed at Rockford, in the county of Winnebago, and State of Illinois, this 10th day of September, 1930.

ARTHUR E. JACOBS.